(12) United States Patent
Warwick (10) Patent No.: US 10,442,158 B2
(45) Date of Patent: Oct. 15, 2019

(54) METHOD AND APPARATUS FOR INFUSING ADDITIVE MANUFACTURED OBJECTS AND THE LIKE

(71) Applicant: Tim Warwick, Middlesex (GB)

(72) Inventor: Tim Warwick, Middlesex (GB)

(73) Assignee: FREEFORM FABRICATION INDUSTRIES LIMITED (GB)

( * ) Notice: Subject to any disclaimer, the term of this patent is extended or adjusted under 35 U.S.C. 154(b) by 39 days.

(21) Appl. No.: 14/780,196

(22) PCT Filed: Mar. 26, 2014

(86) PCT No.: PCT/GB2014/000115
§ 371 (c)(1),
(2) Date: Sep. 25, 2015

(87) PCT Pub. No.: WO2014/155039
PCT Pub. Date: Oct. 2, 2014

(65) Prior Publication Data
US 2016/0067925 A1 Mar. 10, 2016

(30) Foreign Application Priority Data
Mar. 27, 2013 (GB) .................................. 1305619.7

(51) Int. Cl.
*B29C 67/00* (2017.01)
*B32B 13/02* (2006.01)
(Continued)

(52) U.S. Cl.
CPC .............. *B32B 13/02* (2013.01); *B29C 64/20* (2017.08); *B29C 71/0009* (2013.01); *B32B 5/30* (2013.01);
(Continued)

(58) Field of Classification Search
CPC ............ B29C 67/0051; B29C 71/0009; B29K 2067/04; B29K 2995/004; B32B 13/02;
(Continued)

(56) References Cited

U.S. PATENT DOCUMENTS 3,384,505 A 5/1968 Palmer et al.
3,692,023 A * 9/1972 Phillips .................... A61F 13/04
602/7

(Continued)

FOREIGN PATENT DOCUMENTS

DE 19927923 A1 7/2000
GB 2283966 A 5/1995
(Continued)

OTHER PUBLICATIONS

Xue et al., "Polycaprolactone Coated Porous Tricalcium Phosphate Scaffolds for Controlled Release of Protein for Tissue Engineering" J Biomed Mater Res B Appl Biomater. Author manuscript; available in PMC Mar. 16, 2011, p. 1-16.*

(Continued)

*Primary Examiner* — Hai Vo
(74) *Attorney, Agent, or Firm* — Fishman Stewart PLLC (57) ABSTRACT

A method of infusing, infiltrating, or impregnating a three dimensional printed, free-form fabricated or additive manufactured object having at least one of pores and voids in or between particles or sheets of material from which the object is manufactured may include immersing the object in a thermoplastics material such that the thermoplastics material penetrates the object. The method may further include controlling a frequency and an amplitude of pressure oscillation such that the thermoplastics material at least partially fills the at least one of pores and voids and bonds the particles or sheets of material from which the object is manufactured.

23 Claims, 4 Drawing Sheets

(51) Int. Cl.
  *B32B 5/30* (2006.01)
  *B29C 71/00* (2006.01)
  *B29C 64/20* (2017.01)
  *B29C 71/02* (2006.01)
  *B29K 67/00* (2006.01)
  *B29C 64/00* (2017.01)

(52) U.S. Cl.
  CPC ........ *B29C 64/00* (2017.08); *B29C 2071/022* (2013.01); *B29K 2067/04* (2013.01); *B29K 2995/004* (2013.01); *B32B 2260/025* (2013.01); *B32B 2260/046* (2013.01); *B32B 2264/10* (2013.01)

(58) Field of Classification Search
  CPC . B32B 5/30; B32B 2264/10; B32B 2260/046; B32B 2260/025
  See application file for complete search history.

(56) References Cited

U.S. PATENT DOCUMENTS

| | | | |
|---|---|---|---|
| 3,728,206 A * | 4/1973 | Buese | A61F 13/04 206/389 |
| 3,975,479 A | 8/1976 | McClean | |
| 4,863,568 A | 9/1989 | Wijn | |
| 5,204,055 A | 4/1993 | Sachs et al. | |
| 5,902,441 A | 5/1999 | Bredt et al. | |
| 5,977,203 A | 11/1999 | Makuuchi et al. | |
| 6,209,420 B1 | 4/2001 | Butcher et al. | |
| 6,416,850 B1 | 7/2002 | Bredt et al. | |
| 2002/0062909 A1 | 5/2002 | Jang et al. | |
| 2002/0125592 A1 * | 9/2002 | Schulman | A61C 13/0003 264/16 |
| 2002/0143403 A1 * | 10/2002 | Vaidyanathan | A61L 27/446 623/23.51 |
| 2003/0114936 A1 * | 6/2003 | Sherwood | A61F 2/28 623/23.58 |
| 2003/0186042 A1 | 10/2003 | Dunlap et al. | |
| 2005/0059757 A1 * | 3/2005 | Bredt | B33Y 10/00 524/3 |
| 2007/0045891 A1 | 3/2007 | Martinoni et al. | |
| 2007/0111307 A1 | 5/2007 | Auger et al. | |
| 2007/0172599 A1 | 7/2007 | Lewis et al. | |
| 2009/0104449 A1 * | 4/2009 | Farah | C08G 18/088 428/422.8 |
| 2014/0163445 A1 * | 6/2014 | Pallari | A61K 8/0212 602/43 |

FOREIGN PATENT DOCUMENTS

| | | |
|---|---|---|
| JP | 1-254741 | 10/1989 |
| JP | H04-228683 A | 8/1992 |
| JP | 2004-531292 A | 10/2004 |
| WO | 02/053105 A2 | 7/2002 |
| WO | 02091030 A2 | 11/2002 |
| WO | 2014134224 A2 | 9/2014 |

OTHER PUBLICATIONS

English abstract for DE-19927923.
Office Action for corresponding TW 103131011dated Apr. 2, 2018.
Office Action for corresponding JP 2016-504733 dated Apr. 3, 2018.
English translation of Abstract for JPH04-228683.

* cited by examiner

METHOD AND APPARATUS FOR INFUSING ADDITIVE MANUFACTURED OBJECTS AND THE LIKE

CROSS-REFERENCE TO RELATED APPLICATIONS

This application claims priority to British Patent Application No. 1305619.7, filed Mar. 27, 2013, and International Patent Application No. PCT/GB2014/000115, filed Mar. 26, 2014, both of which are hereby incorporated by reference in their entirety.

TECHNICAL FIELD

This invention relates to a method of infusing three dimensional printed, free-form fabricated, or additive manufactured objects; an apparatus for infusing three dimensional printed, free-form fabricated, or additive manufactured objects; and to objects infused by functional thermoplastic polymers.

BACKGROUND

Three dimensional printed, free-form fabricated, or additive manufactured objects can be produced fairly simply using known methods, including but not limited to, the deposit of particles, such as, but not limited to, plaster or plastics, or layers, such as, but not limited to, paper, plastic or fabrics. However, the resulting products/objects may be porous, "soft" and easily damaged. It is therefore desirable to develop improved methods for strengthening or otherwise protecting such objects, and/or providing quality finishes thereto.

Current approaches to strengthening/protecting such manufactured objects fall into the following generalised categories:

Impregnation of the Manufactured Objects with an Acrylic Resin.

In general, the acrylic resin is a cyanoacrylate (not favored due to its toxicity) and it is absorbed into pores or voids in the object where it rapidly polymerizes, in the presence of water (specifically hydroxide ions), forming long strong chains which join and bond the particles and/or layers together. However, because the presence of moisture causes the cyanoacrylate to set, exposure to moisture in the air can cause containers of cyanoacrylate to rapidly deteriorate and become unusable over time. To prevent this, the cyanoacrylate must be stored in an airtight container with a package of a desiccant such as silica gel.

Impregnation of the Manufactured Objects with Waxes.

Whilst waxes are safer to handle than cyanoacrylates, and can be "re-melted" allowing reprocessing of the object, they "shrink" in the pores and consequently, generally provide an unsatisfactory finish. Furthermore their hydrophobic nature makes the wax impregnated object difficult to finish.

Impregnation of the Manufactured Objects with a Curable Resin.

Curable resins, such as, heat cured or UV cured resins, like cyanoacrylate, form a permanent finish and can't be reworked if the finish is unsatisfactory. They also shrink in the pores and, due to their viscous nature, often only impregnate the outermost surfaces, meaning the cured product lacks good structural integrity; and Impregnation of the Manufactured Objects with Two-Part Component Resins.

Typically the two components are pre-mixed so that they will "set", and are used to impregnate the object whilst they are workable. Examples include: polyesters, epoxy resins, and polyacrylates. Disadvantages include the fact they set in a non-reversible manner, suffer from a poor quality finish and mixing results in wastage.

The disadvantages with these alternative impregnating materials and methods are overcome through the use of a thermoplastic polymer which will impregnate the pores and voids in a molten state in a first defined temperature range and set at a second temperature range (lower than said first).

By the use of e.g. pressure, they can be caused to impregnate the pores and voids deeply (and not just the outer surface), resulting in less shrinkage and greater structural integrity providing a better quality of finish. By deeply is meant able to penetrate the pores by greater than 10%, through 20%, 30%, 40%, 50%, 60%, 70%, 80%, and 90%, to 100% impregnation, depending on the thickness of the object.

Furthermore, unlike cyanoacrylate, the current "gold standard", they are safe to handle and do not suffer from premature spoiling. More significantly still, unlike cyanoacrylate and cured resins, the impregnation with a thermoplastic can be reversed, if a good finish is not achieved first time around.

Partculate mixtures containing absorbent fillers for three dimensional (3d) printing are known, and US2005/0059757 provides a good overview of the general state of the additive manufacturing art. It describes rapid prototype techniques including a selective laser sintering process and a liquid binder 3d printing process, which both use layering techniques to build 3d articles.

The selective laser sintering process makes cross reference to U.S. Pat. No. 4,863,568 and other techniques make cross reference to U.S. Pat. Nos. 5,204,055, 5,902,441 and 6,416,850.

US20050059757 describes treating an "intermediate article" with an "infiltrant" to define a substantially solid "final article" having approximately 20-70% infiltrant by volume. Infiltration is described in detail and the liquid resin infiltrants described include those cured by either heat, UV light and electron beam, mixing (of two part systems), catalysts and moisture (including the use of cyanoacrylates).

Reference is also made to the use of liquid infiltrants which may be solidified by cooling (and drying) and waxes are the main group of compounds identified.

These are applied to an intermediate article by, for example, brushing, spraying, dripping or dipping and then the intermediate article is placed in an oven or otherwise cured.

The document additionally teaches that the powder constituents used in the printing of additive manufactured objects may contain activating fluids, including phase change materials including thermoplastics which will melt and solidify to bind particles together.

Other art identified includes GB2,283,966 which relates to pulp mouldings made by applying pulp around a mesh. Laminated object manufacture (LOM) is used to produce a support for the mesh which support is formed by bonding sheet materials together. However, low bond strength between the laminae can result in the articles having inadequate structural rigidity. Thus, resins may be used to impregnate the LOM generated article which are designed to include holes or discontininuities in the plastic "bonding layers" on adjacent laminae, such that upon impregnation with a resin permeation can be achieved.

DE 19927923 discloses post treating porus sintered polystyrene components by immersion in a warmed infiltration material, preferably a low melting point wax.

US 2003/0186042 discloses a selective laser sintered (SLS) product in which voids are created, this time by drilling, which voids are filled with a filler material which is poured, injected, vacuumed, extruded, deposited or otherwise introduced. A wide range of filler materials are contemplated.

In contrast to what is disclosed in the art, the present invention utilises:

i) low melting crystalline polymers, more particularly, caprolactones with highly defined functionality (determined by ring-opening addition polymerisation) and low viscosity, enabling good penetration and flowability from the object surface allowing reclaim and quality surface finishing; and ii) by additionally infusing the material under pressure and oscillating between, typically but not essentially, negative and positive pressures, the thermoplastic material is forced into the object.

Furthermore, the infused object can be tempered and/or annealed in a curing chamber to ensure targeted crystallinity thereby imparting improved characteristics to the infused product.

Other benefits of the method and infusion apparatus will become apparent hereafter.

With regard to infusion apparatus, U.S. Pat. No. 3,384,505 discloses an apparatus used to infuse or impregnate wound glass fibre packages. In fact, at least two independently operated apparatus are required, as a pre-dried object is placed (from an oven) into a pressure vessel, were a vacuum is drawn to remove air trapped in the intertices to facilitate resin pick up when a liquid resin is fed into the partially evacuated immersion vessel, in which the dried object (a wound fibrous material) is submerged in a liquid medium (containing a heat curable thermoset resin) under pressure and then the object is transferred to an oven for curing.

JP 01-254741 discloses an apparatus for producing ceramic paper comprising an immersion tank filed with resin and a drying oven.

In contrast to the above mentioned apparatus, the apparatus of the present invention is able to control all operations sequentially in a single, multi-functional apparatus. It is able to facilitate pre-treatment (e.g. driving off water or volatiles), immersion to impregnate, drainage of excess material by moving the object (through X, Y and Z axis as required), to displace thermoplastics material; remove excess material from the object using a suction and/or blowing tool and then facilitate curing, including tempering or annealing of the thermoplastics, amongst others. Indeed, in some modes of operation a single chamber can be used to perform both immersion and curing under pressure.

Such an apparatus provides the flexibility to treat unique and different objects in contrast to the apparatus of the art which have been designed to process a single article, such as, wound glass fibre packages or sheet paper.

The favoured thermoplastics of the invention are polycapralactones which are, of course, well recognised polyesters, see e.g US 2007/0111037 and U.S. Pat. No. 5,977,203, with a wide range of applications, and are produced by companies such as Perstop.

It is a first object of the present invention is to provide improved methods for infusing three dimensional printed, free form fabricated or additive manufactured objects.

It is a separate and yet further object to identify functional polymers which are safer and have greater versatility for use with said method, and to provide stronger and/or better finished objects infused by said polymers.

It is yet a further and independent object to provide improved apparatus for the automated infusion of three dimensional printed, free form fabricated or additive manufactured objects.

SUMMARY

In accordance with a first aspect of the present invention there is provided a method of infusing, infiltrating or impregnating a three dimensional printed, free-form fabricated or additive manufactured object comprising pores or voids in or between particles or sheets of material from which the object is manufactured characterised in that the object is infused with a thermoplastics material introduced under controlled conditions of temperature and pressure, and wherein the thermoplastics is caused to penetrate the object by immersing the object in the thermoplastics and controlling the frequency and amplitude of pressure oscillation to ensure sufficient infusion into the object to at least partially fill the pores or voids and bond particles or sheets of material from which the object is manufactured.

Preferably the pressure is oscillated between negative or atmospheric pressure and positive pressures including over pressure.

Preferably the particles or sheets of material are deposited in layers.

In one embodiment the sheets of material comprise paper, plastic, or fabric.

In another embodiment the particles comprise a colour absorbent or colour coatable material, preferably plaster or a plastics. The plaster is usually a modified plaster and preferred forms comprise a solvent based co-polymer, typically one in which the co-polymer is polyvinyl acetate (PVA). They may also comprise a colorant.

Preferred thermoplastics for use in the method of the invention are linear or branched semi-crystalline aliphatic polyester thermoplastics with a melting point between 40° C. and 65° C. and a solidification/crystallisation point of between 20° C. and 40° C.

Most preferred are caprolactones or a blend comprising one or more caprolactones.

In a favoured method, prior to infusion with a thermoplastics, the object is heated to a first temperature (T1) and held at a negative pressure (P1) to drive off water and or other volatiles from the pores or voids thereby ensuring the thermoplastics can best penetrate the object. The object is then immersed in the thermoplastics and taken to a second viscosity lowering temperature (T2) typically from 90° C. to 160° C., under a vacuum (P1) or at atmospheric pressure (P0).

Preferably, though not essentially, when the second viscosity lowering temperature (T2) is reached the infusion process begins and the pressure is oscillatied between pressures, preferably a negative pressure (P1) and a positive pressure (P2) or an over pressure (P3).

Once treated the second viscosity lowering temperature (T2) is maintained and the thermoplastics is drained under a positive pressure (P2) or under pressure from the reservoir (14). The object is then moved through various orientations at the second viscosity lowering temperature (T2) to displace surplus thermoplastics material.

The object may then be presented for inspection, the temperature dropped from the second temperature (T2) to a third handlable temperature (T3), intermediate between the first and second viscosity lowering temperatures (T1 and T2), and if required, surplus material can be removed using a novel thermoplastic removal device.

Finally the object is tempered under positive pressure (P2) by moving between one or more further intermediate temperatures (T4 and T5) to control crystalinity.

In accordance with a second aspect of the present invention there is provided an apparatus (10), for post treating three dimensional printed, free-form fabricated or additive manufactured objects (100), comprising:
  a) an infusion chamber (12), in which the object to be infused with a thermoplastics (110) is infused;
  b) a reservoir (14) which, in use, is filled with the thermoplastics;
  c) a curing chamber (16) for heating and curing the object; and
  d) a controller (18) for controlling the operative functions of the apparatus;
characterised in that the reservoir comprises a heating means (20) and sensors (22, 26, 28) such that the thermoplastics can be melted within defined parameters of temperature (T) and the controller enables the sequential steps of infusion and curing in the apparatus.

In accordance with a third aspect of the present invention there is provided an apparatus (10), for post treating three dimensional printed, free-form fabricated or additive manufactured objects (100), comprising:
  a. an infusion chamber (12), in which the object to be infused with a thermoplastics (110) is infused;
  b. a reservoir (14) which in use is filled with the thermoplastics;
  c. a curing chamber (16) for heating and curing the object; and
  d. a controller (18) for controlling the operative functions of the apparatus;
characterised in that at least one chamber is constructed such that reactions can be conducted under both negative pressure (P1) and positive pressure (P2/P3).

In the apparatus of both the second and third aspects there are a number of common features.

In one embodiment it is preferred that the curing chamber has associated therewith a vacuum pump and one or more of at least one heat sensor(s), pressure sensor(s) and/or level sensor(s).

Figure 3:
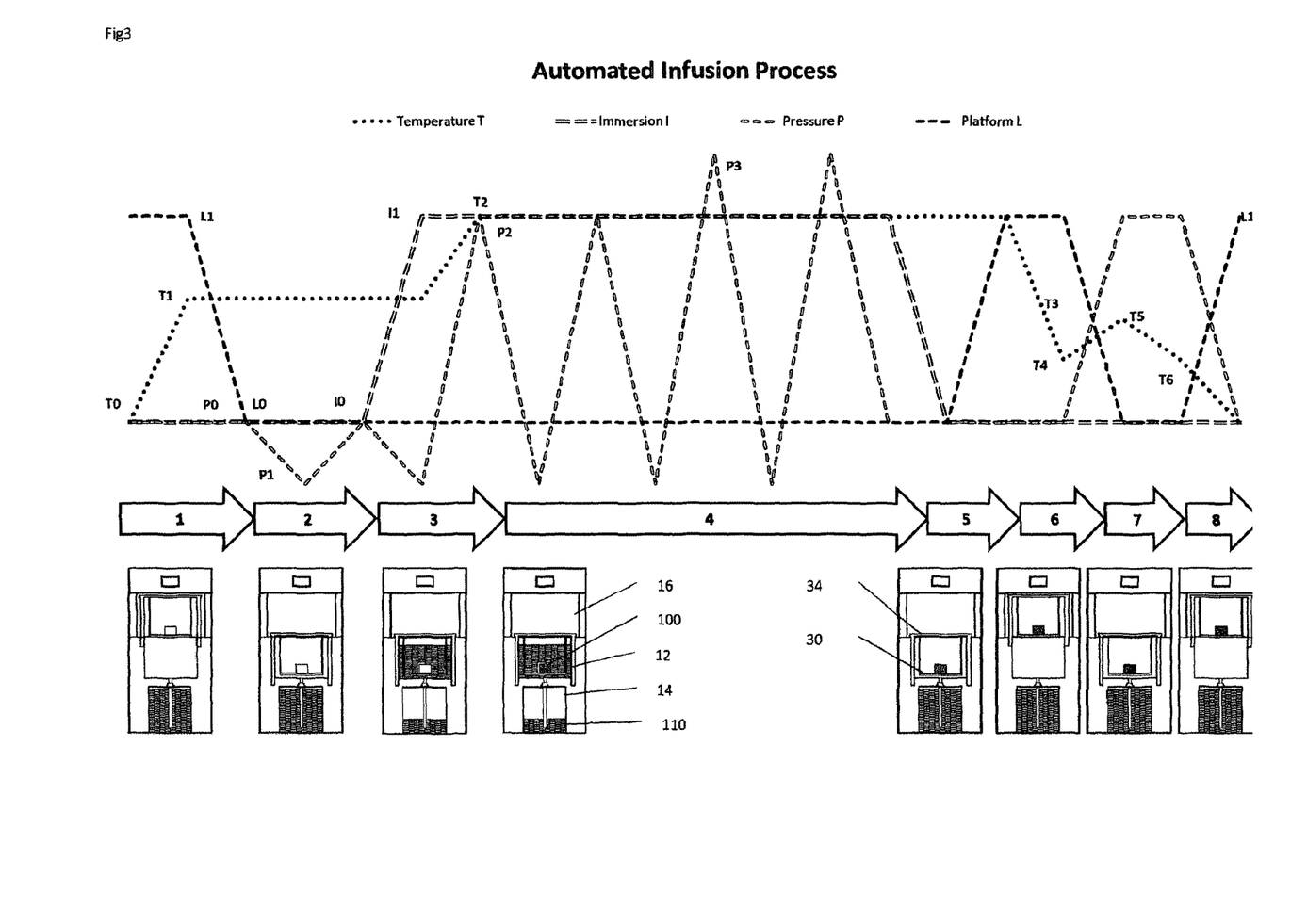
FIG. 3 is a schematic showing exemplary process stages (1-8) together with representations of the infusion apparatus at the different stages of processing.

By "associated therewith", and as will be apparent from FIG. 3 (step 7), it will be apparent that when curing is under pressure, the infusion chamber may also serve as the curing chamber.

Preferably the apparatus further comprises a platform, container or arm for supporting the object and a compressor to pressurise the infusion chamber and assist other operative functions.

More preferably the apparatus also comprises heat means associated with one or more of the infusion chamber and curing chamber.

In a preferred embodiment a lid seals the reaction chamber and provides support for the platform and the apparatus further comprises a viewing window and one or more fans.

Preferred thermoplastics for use with said method of the invention, are a linear or branched semi-crystalline aliphatic polyester thermoplastics with a melting point between 40° C. and 65° C. and a solidification/crystallisation point of between 20° C. and 40° C.

Preferably the functional polymer is a polycaprolactone. Most preferably it is a polyol, more preferably still a diol, triol, or tetrol.

The polycaprolactone may have a molecular weight of from between 2000 to 100,000.

In accordance with a forth aspect of the invention there is provided a three dimensional printed, free-form fabricated or additive manufactured object (100) infused with a linear or branched semi-crystalline aliphatic polyester thermoplastic with a melting point between 40° C. and 65° C. and a solidification/crystallisation point of between 20° C. and 40° C. such that pores or voids in or between particles or sheets of material from which the object is manufactured are penetrated by at least 10%.

BRIEF DESCRIPTION OF THE DRAWINGS

The various aspects of the invention are further described, by way of example only, with reference to the following drawings and Example in which.

DETAILED DESCRIPTION

Figure 1:
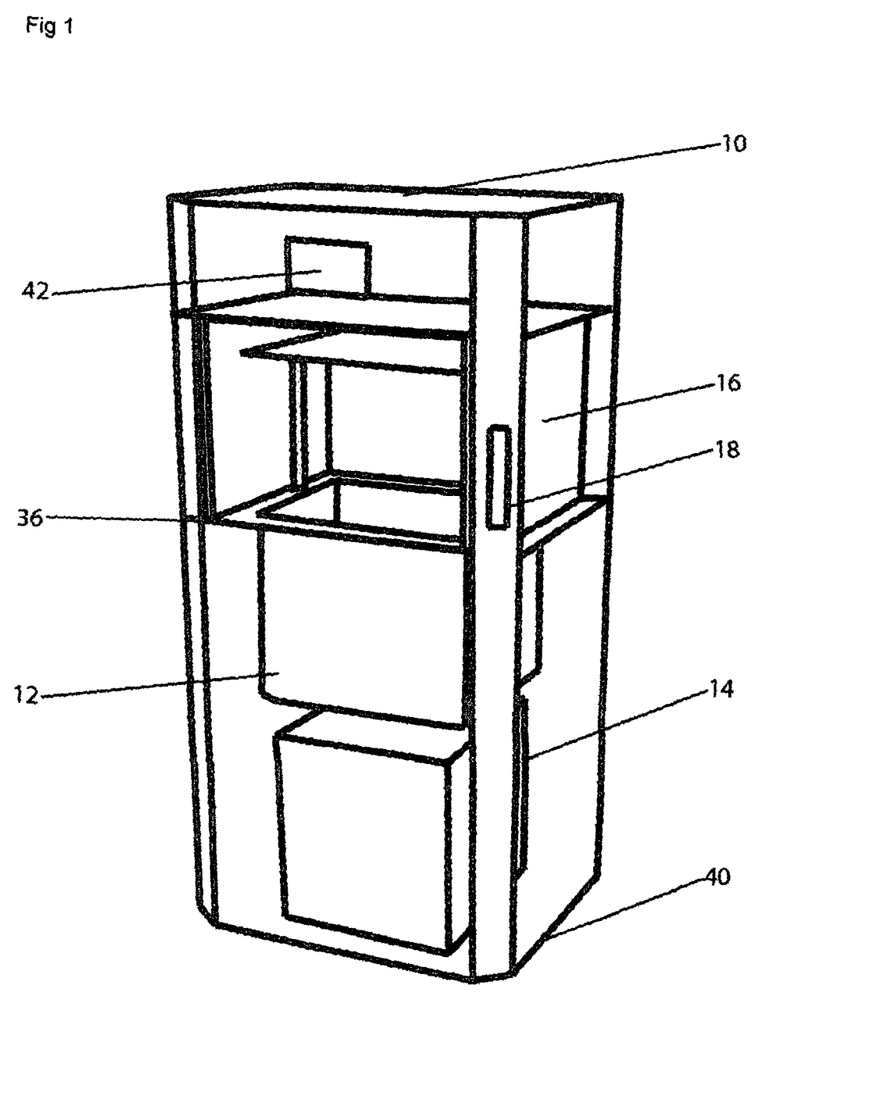
FIG. 1 is a "simple" perspective view of an infusion apparatus according to one aspect of the invention.

Referring to FIG. 1 the infusion apparatus (10) of the invention can, simplistically, be seen to comprise three functional chambers (12, 14, 16), which in the embodiment illustrated are stacked one above another, in a housing (40).

At the bottom of the stack is a reservoir (14) which, in use, is filled with a thermoplastics (110), see FIG. 3, which thermoplastics provides many of the benefits attained using the method of the invention. Positioned above it is an infusion chamber (12), in which an object (100) (FIG. 3) to be infused with the thermoplastics (110) is, in use, infused. Immediately above the infusion chamber is the curing chamber (16), for heating and curing the object and this is provided with a viewing window/door (36). The infusion chamber and curing chamber may be considered reaction chambers.

Above the viewing/curing chamber (16) there are provided the "controls", not shown, which are operated via a control panel (18) and a display (42). The window or door in this chamber allows intervention with the object prior to or during the curing phase (unless pressure is applied).

Figure 2:
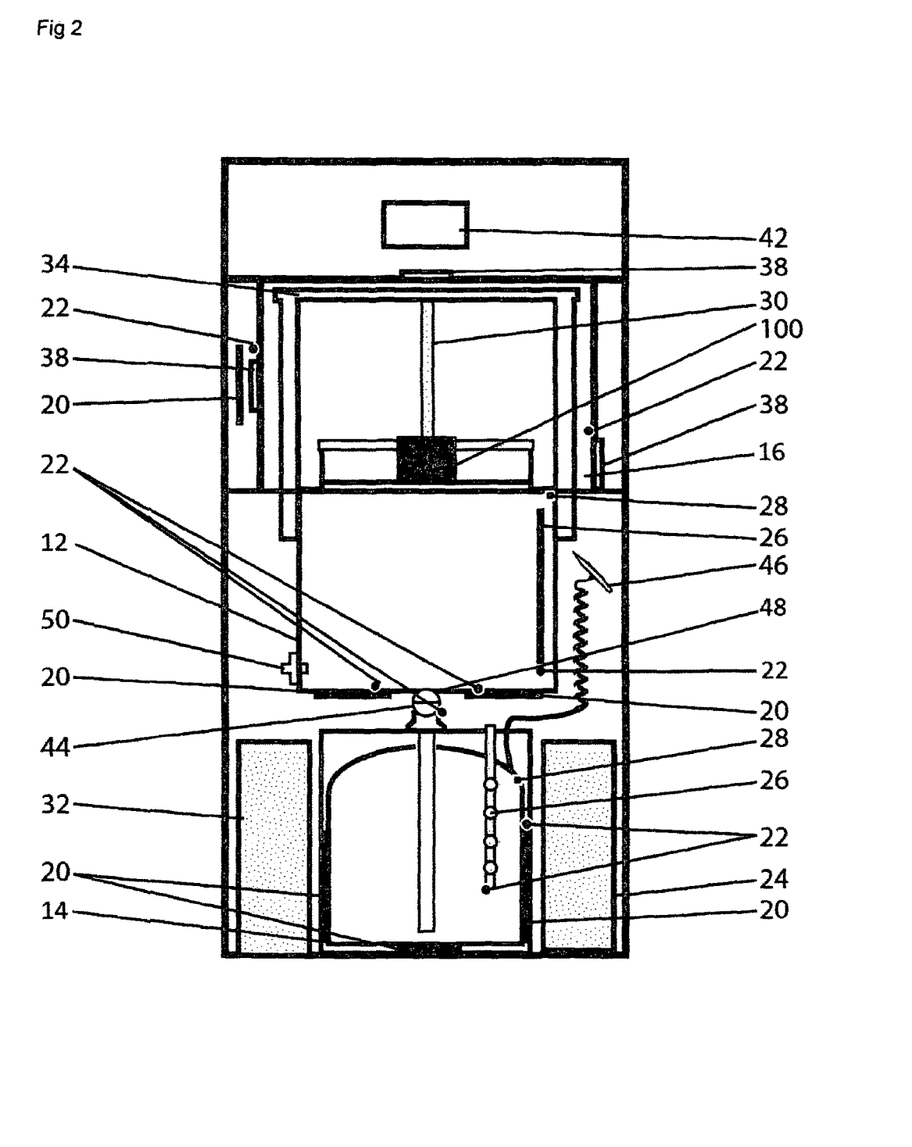
FIG. 2 is a plan view (from the front) of an infusion apparatus of the invention.

Referring to FIG. 2, there is provided more detail on the inter-relationship between the key components and additional features providing functionality.

Housed at the bottom of the apparatus on either side of the reservoir (14) are a vacuum pump (24) and compressor (32) whose function will be better understood with reference to the later described processing. Briefly, however, the compressor enables pneumatic control of the door (36), lid (34), ball valve (44), reservoir (14), infusion chamber (12) and material removal device (46).

Associated with the reservoir (14) are a heating means (20) for heating the thermoplastics to make it liquid, and heat sensors (22), level sensors (26) and pressure sensors (28) allowing control of both temperature and pressure and the flow of the thermoplastic to and from the infusion chamber (12).

The infusion chamber is also heated by heat means (20) and has sensors to monitor liquid levels (26) and pressure (28). It is also fitted with a filter (48) to prevent particles entering the chamber.

A material removal device (46) is also provided.

The upper curing chamber (16) has a clear (viewing) door (36) which can be opened so as to place an object (100) onto a platform (30) which is connected to a lid (34) which can be raised and lowered into the infusion chamber and moved in X, Y and Z planes for optimum handling. It too has a heating means (20) and additionally at least one fan (38) associated therewith to maintain an even temperature. Where pressure is employed in curing the infusion chamber may also partly function as the curing chamber.

The method of the invention can be applied with or without positive pressures, including over pressures which can be achieved hydraulically with the aid of a ram (50).

A method of the invention (utilising positive pressure) is described with reference to FIG. 3.

Stage 1 An object (100) to be treated is placed on the platform (30) (securely clamped if required) at level L1 or in a container that is mechanically attached to the lid (34). The object is heated from room temperature T0 to a "first target temperature" (T1) (e.g. 60° C.) for a sufficient time to allow complete uniformity of temperature through the object to be reached at atmospheric pressure (P0). The skilled person will appreciate the target Temperature (T1) will vary with the object to be infused and the thermoplastics being used.

Stage 2 When the first Target temperature (T1) is reached, the object is lowered on the platform to position L0 in the infusion chamber (12) for desiccation under negative pressure P1 (e.g. −1 Bar). Pressure sensors (28, FIG. 2) detect the absence of water or solvent.

Stage 3 Whilst under negative or atmospheric pressure (P1 or P0) the infusion chamber (12) is filled from empty (I0) with the infusion material (110) such that the object is fully immersed (I1). The fill level is controlled through the use of level sensors (26, FIG. 2) in the reservoir. Once at the desired fill level (I1) (object immersed), the thermoplastic infusion material (110) is heated to a second target temperature (T2) which is selected such that the viscosity of the thermoplastics is low enough that the thermoplastics will drain from the object. Typically, this will be between, e.g. 90° C. and 150° C., for the favoured caprolactones, but with higher molecular weight polymers (greater than 10,000) increased temperatures and pressures (P2) may be used.

Stage 4 Once the second target temperature (T2) in the infusion chamber is reached, the pressure is oscillated between two different pressures which may be negative (P1) (or atmospheric P0) and positive pressures (P2) including over pressures (P3) which may be achieved hydraulically via component (50), e.g. −1 bar to 1000 bar. The frequency and amplitude of oscillation can be varied to suit the geometry and material properties of the object being treated. Level sensors (26, FIG. 2) in the chamber detect and control excessive foaming and ensure sufficient infusion material (110) is present.

Stage 5 Once infused, the infusion material (110) is drained to the reservoir. This may be via positive pressure or gravity at normal atmospheric pressure (P0) or under negative pressure from the reservoir.

Stage 6 The platform is raised to position (L1) into the viewing/cure chamber and may be caused to rotate through any orientation (X, Y, Z planes) to ensure all infusion material (110) is reclaimed. The speed of the platform can be increased to aid material removal.

Stage 7 Once all available infusion material is reclaimed the object is cooled to one or more intermediate temperatures (T3) at which the object may be handled e.g. between 40° C. and 90° C. for inspection. During inspection unset material can be removed with the assistance of a novel handheld air blow and vacuum device (46) with access via open window (36, FIG. 2). The temperature of the air blown through the device is maintained at a temperature at or above T3. This is particularly useful where the object has geometries and cavities which might retain unwanted thermoplastic material. Once inspection is complete the object is lowered into the infusion chamber (12) and cooled under positive pressure (P2) at one or multiple tempering temperatures (T4; T5; T6) which are lower than intermediate temperature T3 where the material is tempered for maximum crystalline structure. Tempering may involve raising and lowering the temperature above and below T4, T5 or T6. In this regard, the infusion chamber is also, in part, being used as a curing chamber.

Stage 8 Once tempered the platform is raised to L1 and the object may be removed.

The use of pressure allows a wider range of thermoplastics to be used since they can be made less viscous under pressure thereby allowing greater penetration to be achieves as illustrated in Example 1 below:

EXAMPLE 1

Figure 4:
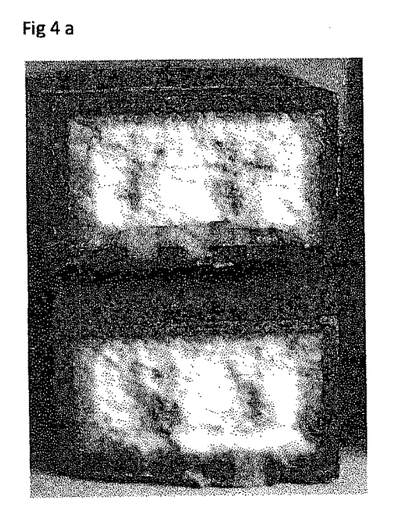
FIGS. 4a and 4b are photographic representation of an object processed without pressure a) according to one aspect of the invention and with pressure b) according to a preferred aspect of the invention.

The benefits of using pressure are illustrated in the following example in which an object was treated:
a) With a caprolactone (molecular weight 25,000) at 120° C., (FIG. 4a); and
b) With the same caprolactone at 120° C., at oscillating pressures between −1 Bar and 4 Bar (FIG. 4b).

As can be seen from the comparative figures, FIGS. 4a and 4b the provision of pressure ensured that the material was fully infused as evidenced by the darker uniform centre in FIG. 4b.

The preferred thermoplastics for use with the methods of the invention are linear or branched semi-crystalline aliphatic polyester thermoplastics with a melting point between 40° C. and 65° C. and a solidification/crystallisation point of between 20° C. and 40° C.

Preferred polyesters for use in the invention are the polycaprolactones.

The general Formula of Polycaprolactone is shown in Formula 1 below:

Polycaprolactones are normally defined as "thermoplastic" at a molecular weight of 10,000 and above, where they have a viscosity of 9,300 Mpas and a melting range of 58-60° C.

However, lower molecular weight polyols, including diols, triols and tetrols, and some copolymers thereof, have melting ranges above room temperature, more preferably above 30° C., such as typically 40-50° C. and with much lower viscosities (as low as 400-500 Mpas) are particularly suitable for the present applications.

The invention claimed is:
1. A three dimensional printed, free-form fabricated or additive manufactured object comprising:
   particles deposited in layers;
   wherein the three dimensional printed, free-form fabricated or additive manufactured object is porous having pores between the particles;

wherein the particles are infused with a thermoplastic material comprising one of a linear or a branched semi-crystalline aliphatic polyester thermoplastic with a melting point between 40 ° C. and 65 ° C. and a solidification/crystallisation point of between 20° C. and 40 ° C. such that the pores are penetrated by the thermoplastic material to at least partially fill the depth of the pores by at least 80% and bond the particles; and wherein the particles include plaster and at least one of a color absorbent material and a colour coatable material.

2. The three dimensional printed, free-form fabricated or additive manufactured object according to claim 1, wherein the thermoplastic material comprises a polycaprolactone.

3. The three dimensional printed, free-form fabricated or additive manufactured object according to claim 2, wherein the polycaprolactone is a polyol.

4. The three dimensional printed, free-form fabricated or additive manufactured object according to claim 3, wherein the polyol is one of a diol, a triol, or a tetrol.

5. The three dimensional printed, free-form fabricated or additive manufactured object according to claim 2, wherein the polycaprolactone has a molecular weight of from 2000 to 100,000.

6. The three dimensional printed, free-form fabricated or additive manufactured object according to claim 1, wherein the particles infused with the thermoplastic material are cured.

7. The three dimensional printed, free-form fabricated or additive manufactured object according to claim 1, wherein the plaster includes a solvent based co-polymer.

8. The three dimensional printed, free-form fabricated or additive manufactured object according to claim 1, wherein the pores are penetrated by the thermoplastic material to at least partially fill the depth of the pores by at least 90% and bond the particles.

9. A method of infusing, infiltrating, or impregnating a three dimensional printed, free-form fabricated or additive manufactured object that is porous having pores between particles, wherein said particles are deposited in layers and from which the object is manufactured, the method comprising:

infusing the object with a thermoplastic material introduced under controlled conditions of temperature and pressure, and wherein the thermoplastic material is caused to penetrate the object by:

immersing the object in a thermoplastic material such that the thermoplastic material penetrates the object; and controlling a frequency and an amplitude of pressure oscillation such that the thermoplastic material at least partially fills the depth of the pores by at least 80% and bonds the particles from which the object is manufactured;

wherein the thermoplastic material is one of a linear or branched semi-crystalline aliphatic polyester with a melting point between 40 ° C. and 65 ° C. and a solidification/crystallization point between 20 ° C. and 40 ° C.; and wherein the particles from which the object is manufactured comprise plaster and at least one of a color absorbent material and a color coatable material.

10. The method according to claim 9, wherein the pressure is oscillated between one of negative or atmospheric pressure and positive pressures including over pressure.

11. The method according to claim 9, wherein the particles further comprise plastics.

12. The method according to claim 11, wherein at least one of the plaster and the plastics includes a solvent based co-polymer.

13. The method according to claim 12, wherein the solvent based co-polymer is polyvinyl acetate (PVA).

14. The method according to claim 9, wherein the particles are colored.

15. The method according to claim 9, wherein the thermoplastic material comprises a polycaprolactone.

16. The method according to claim 9, further comprising heating the object to a first temperature and holding the object at negative pressure to drive off water and or other volatiles from the pores prior to immersing the object in the thermoplastics material.

17. The method according to claim 9, further comprising heating the object to a second temperature of from 90 ° C. to 220 ° C. under one of a vacuum or atmospheric pressure.

18. The method according to claim 17, wherein when the second temperature is reached, the controlling of the frequency and amplitude of the pressure oscillation begins.

19. The method according to claim 18, further comprising maintaining the second temperature, and draining the thermoplastic material under a positive pressure.

20. The method according to claim 19, further comprising moving the object through various orientations at the second temperature to displace thermoplastic material.

21. The method according to claim 19, further comprising at least one of:

lowering the temperature from the second temperature to a third temperature intermediate between the first and second temperatures, and removing material by a thermoplastic removal device.

22. The method according to claim 9, further comprising tempering the object to control recrystalisation of the thermoplastic material.

23. The method according to claim 22, wherein tempering comprises adjusting the temperature such that the object is taken to one or more further intermediate temperatures under positive pressure.

* * * * *